UNITED STATES PATENT OFFICE.

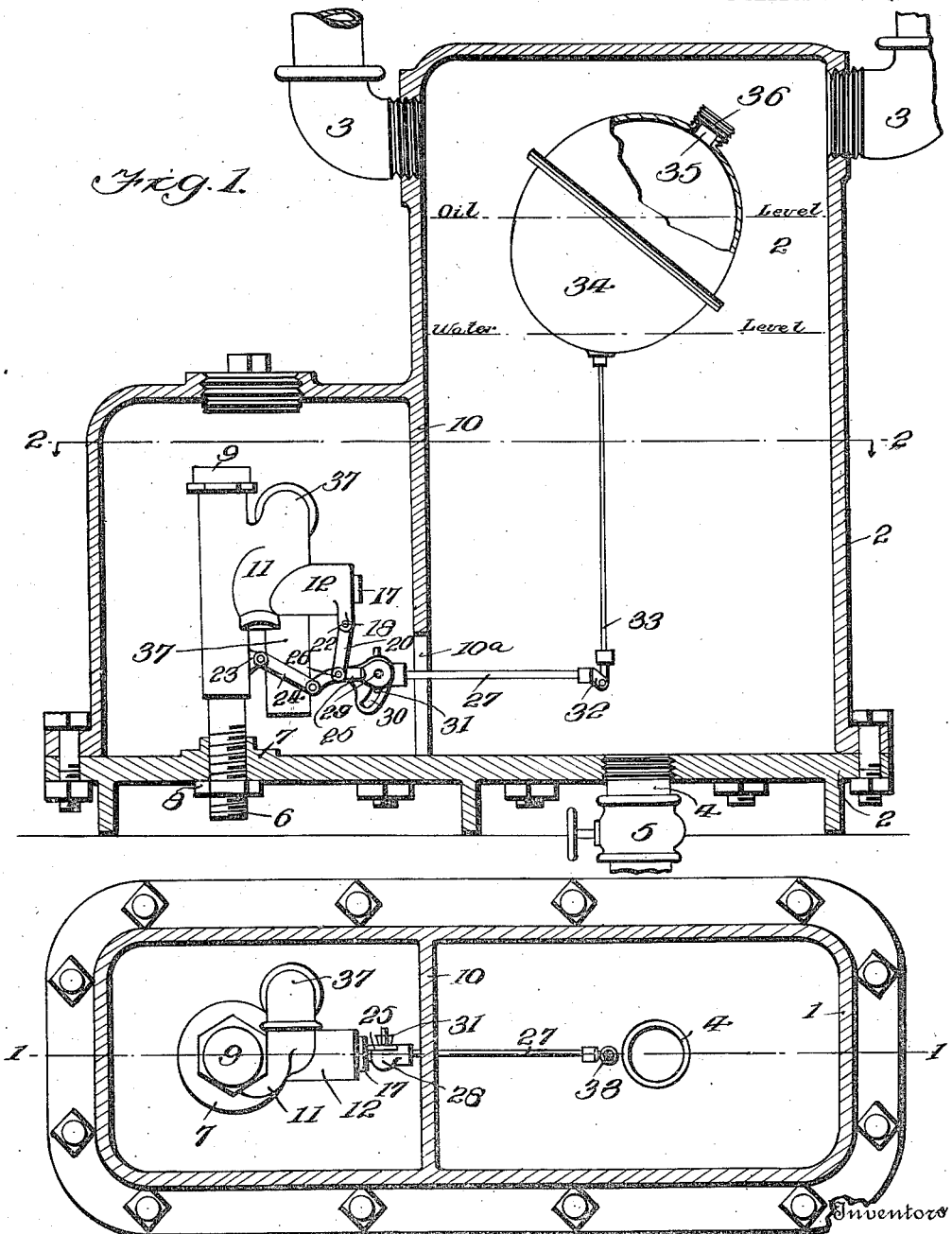

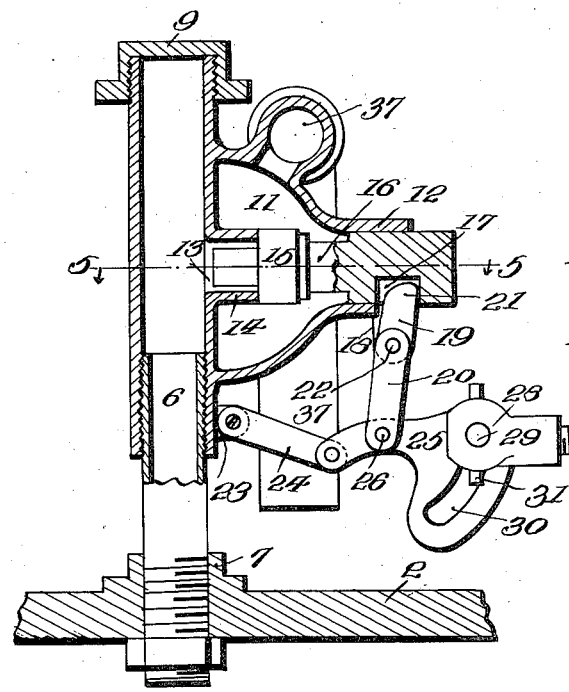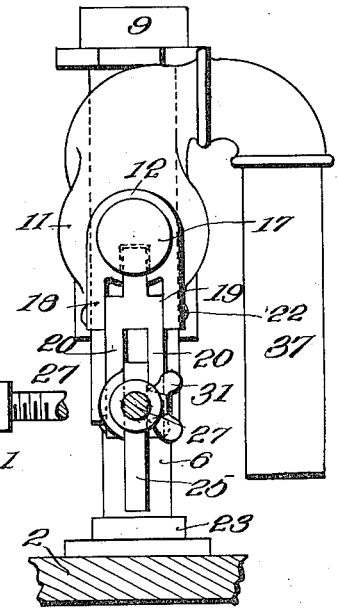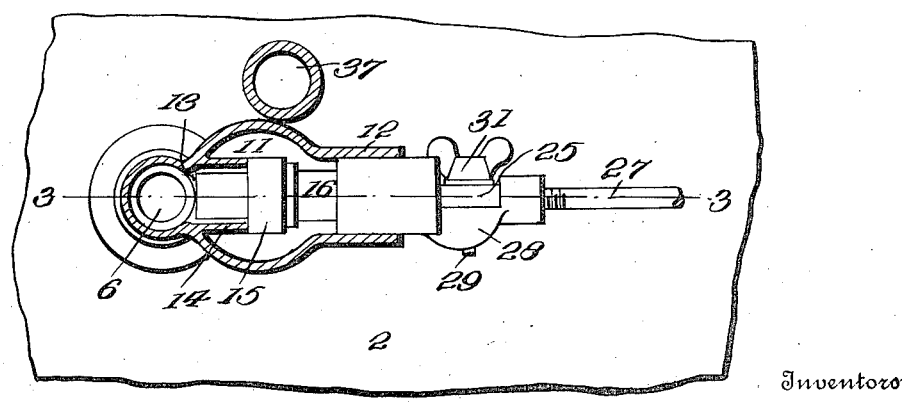

PETER MURPHY AND FRANK M. MURPHY, OF PRESCOTT, ARIZONA.

AUTOMATIC OIL AND WATER SEPARATOR.

1,094,861.

Specification of Letters Patent.

Patented Apr. 28, 1914.

Application filed December 4, 1911. Serial No. 663,866.

*To all whom it may concern:*

Be it known that we, PETER MURPHY and FRANK M. MURPHY, citizens of the United States, residing at Prescott, in the county of Yavapai and State of Arizona, have invented certain new and useful Improvements in Automatic Oil and Water Separators, of which the following is a specification.

Our invention relates to apparatus for separating oil from water and the primary object of our invention is the provision of means whereby oil discharged into a receiving tank may be automatically separated from any water which may have become commingled therewith.

A further object is to provide a separating tank provided with a water discharge valve operated by a float, which latter is so weighted or has such specific gravity as to sink in oil but float in water whereby when the water within the tank has risen above a certain predetermined level, the float will rise, opening the valve and discharging the water.

A further object is to provide means for automatically discharging the water which may collect in the lower portion of a tank containing mixed oil and water without regard to how much or how little oil may be collected upon the top of the water.

A further object is to provide means in connection with the tank and valve mechanism above described whereby a water seal may be provided at all times effectually sealing the tank against the outward passage of oil with the water.

Our invention is illustrated in the accompanying drawings wherein—

Figure 1 is a vertical section on the line 1—1 of Fig. 2; Fig. 2 is a horizontal section on the line 2—2 of Fig. 1; Fig. 3 is a vertical section of the valve mechanism on the line 3—3 of Fig. 5; Fig. 4 is a front elevation of the valve mechanism; and Fig. 5 is a section on the line 5—5 of Fig. 3.

Corresponding and like parts are referred to in the following description and indicated in all the views of the accompanying drawings by the same reference characters.

In referring to these figures, 2 designates a tank or receiving receptacle of any suitable character but shown as L-shaped in side elevation. This tank is provided with connections 3 whereby the tank is connected to an oil tank, reservoir or other source of oil, these connections 3 entering the tank 2 at its upper end. The lower end of the tank is provided with a drainage pipe 4 provided with a valve 5 whereby any oil or water which may gather within the tank may be drawn off. Entering the tank is the water discharge pipe 6 which passes up through a hub 7 preferably formed with the tank, this pipe being held in place by means of a set nut 8. The upper end of the pipe is closed by a cap 9. Preferably the tank is divided into two compartments by means of a vertically extending wall 10 vertically slotted at its lower end as at $10^a$ for the passage of the valve operating lever as will be later described.

Extending from the pipe 6 is a valve casing 11 which as shown is somewhat globular in form at its base and has a contracted relatively small neck 12. The discharge opening 13 of the valve casing is surrounded by an inwardly extending annular wall 14 whose inner edge forms a seat for a valve 15 carried upon a valve spindle 16, this spindle being less in diameter than the wall 14 and extending into the passage surrounded by said wall. The valve stem 16 is enlarged at its outer end so as to have a sliding engagement with the contracted neck 12 of the valve casing and extends beyond the end of the valve casing. The under face of the outer end of the valve stem is slotted as at 17. Preferably formed integral with the valve casing are the depending oppositely disposed ears 18, between which is pivoted a lever 19 having a bifurcated lower end 20 and an upwardly extending portion having a nose 21 which engages within the slot 17 and engages with the forward wall of the slot. This lever is pivoted intermediate its ends upon a pivot pin or bolt 22 which passes through the ears 18. Pivotally supported upon a lug 23 projecting from the pipe 6 are the spaced links 24. Pivoted to the free ends of these links 24 is an angular lever 25. Passing through the lower ends of the links 20 and through the middle of the angular lever 25 is a pivot bolt or pin 26. This lever 25 may have any desired form and carries upon it a projecting arm 27. Preferably the arm 27 carries at its inner end a head 28 which has a flat face fitting against the flattened extremity of the lever 25 and held in rigid engagement with the lever by means of a screw 29. Preferably the extremity of the lever 25 is vertically enlarged and formed with an arcuate slot 30 and the pin 29 passes through this slot, the pin being provided with an enlarged head 31 larger in diameter than the width of the slot. It will be obvious that by this means the arm 27 may be adjusted relative to the lever so as to secure the proper angle for the arm 27. We do not, however, wish to be limited to this particular construction. The outer end of the arm 27 is downwardly bent as at 32, and pivotally attached to this downwardly bent end is an upwardly extending rod 33 carrying at its upper end a float 34. This float is preferably in the form of a hollow metallic ball and has an inlet opening 35 closed by a screw cap 36. This inlet opening provides means whereby the float may be weighted to a predetermined degree as will be later described.

For the purpose of carrying off the water collected in the bottom of the tank 2, we provide a curved pipe 37, the short leg of which is connected to the upper portion of the valve casing 11 and the long leg of which extends downward nearly to but spaced from the bottom of the tank 2.

In the practical operation of our invention, the hollow float 34 is to be filled with water or other weighty material to such a degree that the float will be buoyant in water but will sink in oil. Thus when the float is subjected to the action of rising water, the float will rise but if subjected merely to the action of rising oil, the float will not rise. The parts being in the position shown in Fig. 1, it will be obvious that when mixed oil and water is discharged into the tank 2, the oil will rise to the surface of the water and the water sink to the lower level so that the upper portion of the tank will contain oil while the lower portion of the tank will contain water. As the mixed oil and water continues to flow into the tank, the depth of the water at the bottom of the tank will increase until eventually the water will rise to the level of the float 34. This float will have been entirely unaffected by the oil, but as soon as the level of the water reaches the center of buoyancy of the float, the float will rise. As the float rises, it will carry the free end of the lever 25 upward, depressing slightly the links 24 and carrying upward the rear end of the lever 19. The upper end of the lever 19 will be shifted forward and per consequence will carry outward the valve stem 12, thus lifting the valve 15 from its seat against the wall 14 and permitting the discharge of fluid. As soon as this has occurred, the water in the tank will commence to flow out through the pipe 37 into the valve casing 11 and out through the discharge 13. This discharge of water will continue until the level of the water has dropped so far as to cause the float to fall, whereupon the valve will be closed by the weight of the float and of the parts connected thereto, thus cutting off the passage of water out of the pipe 6.

It will be obvious that it does not matter how much oil is collected within the tank 2 as the float is too heavy to float on oil and will only float when water is collected. Thus if there is very little water mixed with the oil and water collects in the lower portion of the tank, the float will not be operated by the collection of oil within the tank.

While this device is particularly adapted for crude oil, it will be obvious that it might be applied to lighter oils and in other situations where a valve and float operating on this principle is desired. We do not, of course, wish to limit ourselves to the precise details of construction as it is obvious that many changes might be made without departing from the spirit of the invention.

While our device has been referred to in the foregoing description as being intended for separating oil and water, it will be obvious that it will operate in the same manner with any liquids having different specific gravities or different densities. It will also be plain that if for instance the oil has a greater specific gravity than the water and therefore settles to the bottom of the tank, in that case the oil will be drawn off when the float is operated and the water will remain within the chamber or be carried off in any desired manner therefrom. It will be also noted that the float in order to operate properly must be lighter than an equal mass of the denser liquid contained within the chamber or tank but heavier than an equal mass of the less dense liquid contained therein, in other words, that it has a mean weight between the weight of an equal mass of the denser liquid and the weight of an equal mass of the less dense liquid, and it will be obvious also that it is extremely important that the buoyancy of the float be adjustable so that it may be applied to oils of various degrees of specific gravity, or to mixtures of liquids having different specific gravities, and that it is also important that the arm carrying the float be adjustable so as to cause the valve to operate when the proper amount of water or other liquid has collected within the float chamber. The oil collected in the tank returns into the main oil tank (which is not shown) through one of the pipes 3. It is for this purpose that we provide the double connection to the oil chamber.

It will be noted that it is necessary that the float be provided with a closure for the reason that the float is submerged entirely within the oil and does not float upon the surface of the oil but upon the surface of the water beneath the oil. It is also to be pointed out that by our construction a certain amount of water is always left in the bottom of the tank or receptacle 2 and that this water can never fall below a level higher than the uppermost portion of the pipe 37, so that the pipe 37 and the chamber 11 are always filled with water. The water which is thus held in the lower portion of the casing supports the oil in the upper portion of the casing and prevents the oil from falling to the bottom, and thus the oil is kept in position where it may be readily drawn off or returned to the main oil tank by one of the main tanks 3, which would not be the case were the water allowed to sink to such position that the oil would be very much lower than the pipes 3. It is also to be noted that a certain siphoning action is secured by reason of the fact that the pipe 37 constitutes one leg of a siphon, the other leg of which is the pipe 6. This siphonic action only lasts while the valve is open but it tends to a very rapid discharge of the water from the reservoir while the valve is open.

What we claim is:

1. An apparatus of the character described comprising a tank containing liquids of different densities and provided with an outlet opening, a valve controlling the discharge therethrough, a lever arm angularly adjustable in a vertical plane with respect to the valve, a lever operatively connecting the lever arm and valve to operate the latter, and a float operatively connected to the lever arm, said float being adjustable in weight and its weight being so adjusted that it will sink in the lighter liquid and float upon the heavier liquid.

2. A separator for a mixture of two liquids having different densities comprising a settling tank having an outlet pipe, a valve controlling the passage through said outlet pipe, a lever arm angularly adjustable in a vertical plane with respect to the valve acting to open the valve when moved in one direction and to close the valve when moved in the other direction, and a float connected to said lever, said float being lighter than an equal mass of the denser liquid but heavier than an equal mass of the less dense liquid.

3. An apparatus for separating mixed liquids of different densities, including a receiving tank, an outlet pipe opening through the bottom of the receiving tank, a valve controlling the discharge of liquid into the outlet pipe, a lever operatively engaging said valve, an arm operatively connected to said lever, said arm being rotatably adjustable in a vertical plane, a float in the tank lighter than an equal mass of the denser liquid but heavier than an equal mass of the less dense liquid, and a rod upon which the float is mounted pivotally connected to the end of the arm.

4. An apparatus for separating intermingled liquids of two different densities, comprising a settling tank having an outlet, a valve controlling the passage of liquid through said outlet, a float operatively connected to the valve, means for adjusting the float with respect to the valve to render it operable at any desired level in the tank, and means for adjusting said float to vary its specific gravity according to the specific gravity of the liquids to be separated.

In testimony whereof we affix our signatures in presence of two witnesses.

PETER MURPHY. [L. S.]
FRANK M. MURPHY. [L. S.]

Witnesses:
O. H. McNEELY,
G. GARBARINO.